Patented Dec. 24, 1946

2,413,224

UNITED STATES PATENT OFFICE 2,413,224

PHTHALOCYANINE SULFONHYDRAZIDES

Arthur Lawrence Fox, Easton, Pa., assignor to General Aniline & Film Corporation, New York, N. Y., a corporation of Delaware No Drawing. Application July 11, 1945, Serial No. 604,514

10 Claims. (Cl. 260—314.5)

This invention relates to new phthalocyanine derivatives.

The term phthalocyanine is used herein in the generic sense to define tetraazaporphins in which each of the four pyrrole nuclei is fused to an aromatic nucleus, e. g., phenyl, biphenyl, naphthyl, anthranyl, etc., of which phthalocyanine itself (tetrabenzotetraazaporphin) is a well-known example. The phthalocyanine molecule may be metal free or contain a metal in complex combination, for example, copper, cobalt, nickel, iron, aluminum, etc.

It is an object of the present invention to provide new phthalocyanine derivatives. It is a further object to provide colors of the phthalocyanine series. It is a still further object to provide a process for the manufacture of the new phthalocyanine derivatives. Other objects of the invention will appear as the description proceeds.

I have found that the above objects may be accomplished by condensing a phthalocyanine sulfonylchloride with a hydrazine which may be hydrazine itself or a primary or secondary alkyl, substituted alkyl, alicyclic, aryl or heterocyclic hydrazine. All of these hydrazines contain a reactive hydrogen atom attached to one of the nitrogens of the —N.N— group.

The preparation of the new phthalocyanine derivatives can be effected by reacting the corresponding phthalocyanine sulfonylchloride with the hydrazine at room or elevated temperatures in the presence of a suitable reaction diluent, for example, water, alcohol, acetone, nitrobenzene or an excess of the hydrazine, etc.

In addition to hydrazine itself, suitable hydrazines for the preparation of the new compounds are, for example, methyl, ethyl, propyl and butyl hydrazine, sym. and asym. dimethyl hydrazine, N,N-bis(β-hydroxyethyl) hydrazine, cyclohexyl hydrazine, benzyl hydrazine, phenyl hydrazine, p-chlorophenyl hydrazine, p-bromophenyl hydrazine, p-sulfophenyl hydrazine, o-, m-, or p-tolyl hydrazine, p-xylyl hydrazine, 3-hydrazinoaniline, sym. and asym. diphenyl hydrazine, triphenyl hydrazine, naphthyl hydrazine, α-methyl-phenyl hydrazine, α-ethyl-phenyl hydrazine, α,β-dimethyl-phenyl hydrazine, 2-hydrazinopyridine, α-quinoyl hydrazine, α-lepidyl hydrazine, α-hydrazoquinoline, 4-aminomorpholine, 3-hydrazino-1,2,4-triazole, 5-hydrazinotetrazole, etc.

The new products are phthalocyanines containing attached to the arylene nuclei one or more unsubstituted or alkyl, substituted alkyl, alicyclic, aryl or heterocyclic sulphonhydrazide groups. In addition to the sulfonhydrazide group or groups, other substituents, such as halogen atoms, e. g., chlorine, or amino or carboxy radicals may be attached to the arylene nuclei of the phthalocyanines. The number of the sulfonhydrazide groups on the arylene nuclei may be varied depending on the number of sulfonylchloride groups on the arylene nuclei of the corresponding phthalocyanine sulfonylchlorides. In some instances the new products may also contain attached to the arylene nuclei one or more sulfonic acid groups, either free or as the hydrazine salt, not all of the sulfonylchloride groups being converted to sulfonhydrazide groups in the reaction. They range in color from bluish-green to green, being somewhat greener in shade than the phthalocyanine sulfonamides described in U. S. P. 2,300,572. They may be employed as pigments or as dyestuffs depending on their solubility characteristics.

Dyestuffs which are soluble in dilute aqueous caustic alkali, e. g., sodium, potassium, or lithium hydroxide, etc., may be prepared by introducing onto the arylene nuclei of the phthalocyanine molecule a plurality of sulfonhydrazide groups containing a free hydrogen atom on the nitrogen of the sulfamyl portion thereof. Compounds of this character are capable of dyeing directly cotton, wool, and silk, showing particularly good affinity for silk. Employed in the form of their soluble alkaline salts, particularly sodium, potassium, ammonium or lithium, they are suitable as colorants for the preparation of writing ink fluids, showing to particular advantage in writing inks rendered quick drying by small amounts of caustic alkali, being, generally, quite stable in dilute aqueous caustic alkali.

The starting phthalocyanine sulfonylchlorides employed in the preparation of the phthalocyanine sulfonhydrazides may be obtained by reacting chlorosulfonic acid with the corresponding phthalocyanines at an elevated temperature as described in U. S. P. 2,219,330. They may also be made from the corresponding phthalocyanine sulfonic acids or their salts by treatment with phosphorus pentachloride.

The invention is further illustrated by the following specific examples to which, however, it is not to be limited. Parts are by weight unless otherwise noted.

Example 1

Ten parts of hydrazine hydrate is dissolved in 50 parts of water and 10 parts of copper phthalocyanine tetrasulfonylchloride added. Stirring is then instituted and continued for several hours at room temperature until dissolution is complete. The reaction mixture is then stirred into 4 volumes of 10% hydrochloric acid and the precipitated dyestuff filtered and dried. There is obtained a bluish-green powder which is quite soluble in dilute aqueous sodium hydroxide.

*Example 2*

Twenty parts of copper phthalocyanine tetrasulfonylchloride is stirred into an excess of phenyl hydrazine which is heated on the steam bath. The mixture at once begins to foam and the reaction takes place quite rapidly. In 30–45 minutes only a dark green solid material remains. This material is then stirred into approximately 4 volumes of 10% hydrochloric acid and the precipitate filtered and dried. The product thus obtained is somewhat soluble in dilute aqueous sodium hydroxide and dyes silk a vivid green shade.

*Example 3*

Twenty parts of copper phthalocyanine tetrasulfonylchloride is stirred into a mixture of 30 parts of 4-sulfophenylhydrazine in 100 parts of nitrobenzene. The resulting mixture is heated to 50–60° C. while stirring and then allowed to slowly cool to room temperature after which stirring is continued for several hours. The nitrobenzene is then removed by means of steam distillation and the resulting aqueous suspension acidified with 10% hydrochloric acid. The precipitated product is filtered and dried. A green powder is obtained which is quite soluble in dilute aqueous sodium hydroxide and is quite satisfactory for use as a dyestuff for writing ink fluids.

As various other embodiments of the invention will occur to those skilled in the art, it is not intended that the scope of the patent be limited except as is required by the prior art and the appended claims.

I claim:

1. A phthalocyanine containing attached to the arylene nuclei at least one sulfonhydrazide group.

2. A metal phthalocyanine containing attached to the arylene nuclei at least one sulfonhydrazide group.

3. A copper phthalocyanine containing attached to the arylene nuclei at least one sulfonhydrazide group.

4. A copper phthalocyanine containing attached to the arylene nuclei a plurality of sulfonhydrazide groups.

5. A copper phthalocyanine of the benzene series containing attached to the phenylene nuclei a plurality of sulfonhydrazide groups.

6. A copper phthalocyanine of the benzene series containing attached to the phenylene nuclei a plurality of unsubstituted sulfonhydrazide groups.

7. A copper phthalocyanine of the benzene series containing attached to the phenylene nuclei a plurality of $\alpha$-alkyl-$\beta$-sulfonhydrazide groups.

8. A copper phthalocyanine of the benzene series containing attached to the phenylene nuclei a plurality of $\alpha$-aryl-$\beta$-sulfonhydrazide groups.

9. A copper phthalocyanine of the benzene series containing attached to the phenylene nuclei a plurality of $\alpha$-phenyl-$\beta$-sulfonhydrazide groups.

10. A process of preparing a phthalocyanine sulfonhydrazide which comprises condensing a phthalocyanine sulfonylchloride with a hydrazine.

ARTHUR LAWRENCE FOX.